United States Patent
Alexander, Jr. et al.

(10) Patent No.: US 6,324,163 B1
(45) Date of Patent: Nov. 27, 2001

(54) LAN EMULATION SERVICE DELAY OF MULTICAST TREE GENERATION DURING CONGESTION

(75) Inventors: Cedell Adam Alexander, Jr., Durham; Jim P. Ervin, Raleigh; Edward Joel Rovner, Chapel Hill; Matthew Blaze Squire, Raleigh; Mark Alan Tippens, Apex, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/977,641

(22) Filed: Nov. 24, 1997

(51) Int. Cl.[7] .............................. H04L 12/28; G01R 31/08
(52) U.S. Cl. ........................ 370/229; 370/236; 370/401; 370/420
(58) Field of Search ..................................... 370/229, 230, 370/236, 397, 445, 461, 395, 392, 351, 396, 252, 401, 466, 420; 340/825.06, 286.02; 713/401

(56) References Cited

U.S. PATENT DOCUMENTS

| | | | |
|---|---|---|---|
| 5,062,106 | 10/1991 | Yamazaki et al. | 370/94.1 |
| 5,369,639 | * 11/1994 | Kamerman et al. | 370/85.3 |
| 5,581,552 | 12/1996 | Civanlar et al. | 370/396 |
| 5,600,644 | 2/1997 | Chang et al. | 370/404 |
| 5,636,345 | 6/1997 | Valdevit | 395/200.11 |
| 5,805,805 | * 9/1998 | Civanlar et al. | 395/200.5 |
| 5,812,552 | * 9/1998 | Arora et al. | 370/401 |
| 5,835,481 | * 11/1998 | Akyol et al. | 370/216 |
| 5,870,589 | * 2/1999 | Alexander, Jr. | 395/500 |

FOREIGN PATENT DOCUMENTS

| | | |
|---|---|---|
| WO 97/02683 | 1/1997 | (WO) . |
| WO 97/02684 | 1/1997 | (WO) . |
| WO 97/02718 | 1/1997 | (WO) . |

OTHER PUBLICATIONS

"Multiplexing Local Area Network Emulation Data Direct Virtual Circuit Connections Between IBM Forwarding Engines", IBM Technical Disclosure Bulletin, vol. 39, No. 07, Jul. 1996, pp. 37–39.

"Method for Improving Network Availability with Redundant Network Servers", IBM Technical Disclosure Bulletin, vol. 39, No. 08, Aug. 1996, pp. 195–196.

* cited by examiner

Primary Examiner—Alpus H. Hsu
Assistant Examiner—Duc Ho
(74) Attorney, Agent, or Firm—Joscelyn G. Cockburn

(57) ABSTRACT

A method of alleviating network congestion in an emulated Local Area Network (ELAN) within an Asynchronous Transfer Mode (ATM) network is implemented. The method mitigates network congestion by distributing the connection times of Local Area Network (LAN) Emulation Client (LEC) to an ELAN over random periods of time. When a LAN Emulation Server (LES) or Broadcast and Unknown Server (BUS) attempts to build point-to-multipoint connections to the LEC, it issues control messages to network switches. If the messages are dropped or rejected the LES or BUS recognizes the network is in a congested state and randomly retries to attempt connection.

30 Claims, 6 Drawing Sheets

FIG. 1 (Prior Art)

| 7 | APPLICATION LAYER | PROVIDES A MEANS FOR APPLICATION PROCESS TO COMMUNICATE WITH ONE ANOTHER THROUGH THE OSI SYSTEM. CONTAINS MANAGEMENT FUNCTIONS TO SUPPORT DISTRIBUTED APPLICATIONS. |
|---|---|---|
| 6 | PRESENTATION LAYER | PROVIDES REPRESENTATION OF INFORMATION TO APPLICATION LAYERS IN A WAY THAT PRESERVES THE MEANING WHILE RESOLVING ANY DIFFERENCES IN FORMAT AND DATA REPRESENTATION BETWEEN THE APPLICATION SYSTEMS. |
| 5 | SESSION LAYER | PROVIDES THE MEANS NECESSARY TO COORDINATE DIALOGUE BETWEEN PRESENTATION ENTITIES. |
| 4 | TRANSPORT LAYER | PROVIDE END-TO-END CONTROL TO ALLOW FOR ERROR RECOVERY AND DETECTION TO THE HIGHER LAYERS. |
| 3 | NETWORK LAYER | ESTABLISHES, MAINTAINS, AND TERMINATES NETWORK CONNECTIONS BETWEEN END SYSTEMS. RESPONSIBLE FOR CONTROLLING THE FLOW OF DATA TO THE NETWORK. |
| 2 | LINK LAYER | PROVIDES SYNCHRONIZATION AND ERROR CONTROL FOR INFORMATION TRANSMITTED OVER THE PHYSICAL LINK. |
| 1 | PHYSICAL LAYER | PROVIDES ELECTRICAL, MECHANICAL, FUNCTIONAL, AND PROCEDURAL CHARACTERISTICS REQUIRED FOR THE PHYSICAL LINK. |

LAN EMULATION SERVICE DELAY OF MULTICAST TREE GENERATION DURING CONGESTION

TECHNICAL FIELD

This invention relates in general to data processing networks, and in particular, to LAN emulation in switched ATM networks.

BACKGROUND INFORMATION

Asynchronous Transfer Mode (ATM) is an emerging network technology that is designed to transport information between communicating stations in a point-to-point fashion. The interest in ATM is its promise of high bandwidths and quality of service. ATM is a connection oriented architecture, in contrast to network architectures that are structured to broadcast data from the source to the destination. In ATM, the source negotiates a connected path to the destination before it proceeds to transmit its information to the recipient. ATM protocols (or rules, usually implemented in software) define the communications necessary to establish the connection. An ATM attached device has an ATM address in addition to any other network addresses it might have, depending on the particular ATM configuration within which it is incorporated. Some possible configurations will be described subsequently. Once a connection is established, the source station transmits its data only to the destination (a "unicast").

In contrast to connection oriented architectures are broadcast networks. In these, data is sent from a source station to a destination station by broadcasting it to all addresses where the recipient plucks it off the network while the other stations on the network ignore traffic not bound for them. Broadcast architectures provide one motivation for structuring a network as a set of interconnected subnetworks or subnets.

In a large network, the proliferation of broadcast packets would overwhelm the network. Another simply reflects the nature of the pattern of growth of network communication generally. Although a particular network may start out as a freestanding Local Area Network (LAN), eventually end-station users will probably want to avail themselves of the services available on other networks, and look to connect their network with other networks. When this occurs, it is intuitive, as well as more precise, to view the resulting network structure as a set of subnets within a larger network, for example, an "internetwork." However, a station on one internetworking subnet that wishes to communicate with a destination on another subnet can only do so if there is connectivity between the subnet in which the source resides and the subnet in which the destination resides.

Communications methodologies between subnets are usually termed to as "layer-3" protocols. This refers to the layered architecture networking model of the International Standards Organization (ISO). This model is illustrated in FIG. 1. Layer-3 may sometimes be referred to as the "network" layer, and is equivalent to the "internetworking" layer in the TCP/IP model.

Connectivity between layer-3 subnets is provided by a device termed a router. When a source station on one layer-3 subnet wishes to communicate with a destination station on another layer-3 subnet, it broadcasts the data in the usual way. However, now it is the router that plucks the data packets off the first subnet and forwards it to the destination station via the destination station's layer-3 subnet to which the router is also attached.

Numerous types of networks coexist in the data communications industry. In addition to ATM, there may be LANs, Wide Area Networks (WANs), and others. There is a need in the industry for interconnection between different network architectures and, in particular, users of preexisting LANs have a need to connect to emerging high speed network technologies, such as ATM. The need for incorporating or interfacing preexisting networks (more precisely subnetworks) into an ATM environment has led to the specification of several methodologies to support preexisting network architectures within ATM.

One such methodology is the emulated LAN (ELAN) which simulates classical LAN protocols in an ATM environment. (Classical LAN protocols, for example Ethernet and Token Rings, are referred to as legacy LANs.) The protocols that provide the specification for ELANs are called LAN emulation (LANE). Layer-3 protocols run on top of ELANs just as they do in legacy LANs. Hosts attached to the ELAN include emulation software that allows them to simulate legacy LAN end stations. Such hosts are called LAN Emulation Clients (LEC). The LEC software hides the ATM from the LAN protocols within the LEC device, and a LEC can utilize those protocols as if it were a legacy LAN. A LEC can also provide a standard LAN service interface to a layer-3 entity in the same layer-3 subnet. Such a LEC is a LAN Switch that is usable to interface a legacy LAN with an ELAN.

Communication between LECs on an ELAN can be effected over the ATM. Each LEC has a physical, or Media Access Control (MAC) address associated with it, as well as an ATM address. For one LEC on a ELAN to communicate with another, it must obtain the ATM address of the destination LEC, given the destination MAC address. This address resolution is mediated through a LAN Emulation Server (LES). The source LEC issues a LANE Address Resolution Protocol Request (LE_ARP_Request) to the LES. Provided the destination station has previously registered its MAC address, ATM address pair with the LES serving the ELAN, the LES returns the ATM address of the destination to the requesting LEC in an ELAN Address Resolution Protocol Reply (LE_ARP_Reply). The source LEC can then use the ATM address to establish a connection to unicast data to the destination, a so-called data direct Virtual Channel Connection (VCC), and transmit its data to the destination thereon.

LANEs are also specified for emulation of source routed LANs, for example Token Rings, as well as nonsource routed LANs, such as Ethernets. In source routed LANs, packets being sent to a destination station contain a Routing Information Field (RIF) that includes a path from source to destination that is an ordered set of route descriptors, ring and bridge numbers, forming the route between source and destination station. Operations performed on MAC address described hereinabove are correspondingly performed on the RIF in a source routed ELAN.

Should the destination not have registered with the LES, the source communicates with the destination using conventional LAN methodology. This is mediated through a Broadcast and Unknown Server (BUS). The LEC sends its data to the BUS which then broadcasts it. Just as in a legacy LAN, the broadcast data is plucked from the network by the destination station, and is ignored by the other devices on the network. Exactly the same process is used if the destination is on a subnetwork, either a legacy LAN or an ELAN, in a different layer-3 subnet. In that case, the broadcast data is gathered by a router connected to the ELAN and forwarded via layer-3 protocols to the destination, as described hereinabove, just as if the ELAN were a legacy LAN.

When an LEC seeks to join an ELAN, connections must be established between the LES, BUS and the LEC. This initialization may occur when a particular LEC is powered up, for example, or if the LANE service or switch network recovers from a fault or is restarted. A LEC joining the ELAN must be added to point-to-multipoint connections that carry control and data frames to the LECs on the ELAN from the LES and BUS. Point-to-multipoint connections in an ATM network are connections from a single source station to multiple destination stations. Here, the LES and BUS each represent the single source station and the LECs are the multiple destination stations for the connections carrying control and data frames to the LECs. The process of adding LECs to these multipoint connections requires ATM switches in the network to process special control messages.

In large networks, switches may not have the processing power or memory to handle the addition of large numbers of LECs when they join an ELAN simultaneously. This can occur if the LANE service or switch network recovers from a fault or is restarted. If such a congested state occurs in the network, the control messages, so-called Add Party messages, will either be explicitly rejected or dropped by the ATM switches. This generally forces the LECs to attempt to join the ELAN again. If many of the LECs attempt to rejoin the network, additional network congestion occurs which can prevent, or at least greatly delay, stabilization of the network. Thus, there is a need in the art for a method by which the addition of the LECs can be distributed in time under the control of the LES and BUS, so as to reduce network congestion.

SUMMARY OF THE INVENTION

The previously mentioned needs are addressed by the present invention, which places the mitigation of a congested state at the central point of an ELAN, namely, the LES and BUS, rather than relying on the LECs themselves to relieve the congestion.

The LES and BUS relieve the congestion on the network by distributing the addition of joining LECs in time. LECs joining the ELAN must be added to point-to-multipoint connections carrying control and data frames to the LECs from both the LES and BUS. The LES and BUS mediate this addition of joining LECs by issuing Add Party messages to ATM hardware, namely switches, in the network. During a congested state of the network, the switches may be unable to handle the addition of large numbers of LECs. In that case, the LES and BUS will time out or a network switch will expressly reject the Add Party message, indicating congestion exists in the network.

After issuing an Add Party message, the issuing LES or BUS may receive a response containing a cause code indicating network congestion, or the Add Party message may be dropped. If the Add Party message is dropped, switches receiving the Add Party message fail to respond before the timer on the LES or BUS times out.

In an embodiment of the present invention, the issuing LES or BUS will randomly delay a subsequent Add Party message instead of terminating the LEC's ELAN membership. When one of the aforementioned conditions, signifying network congestion, occurs, the LES or BUS that issued the initial Add Party message will select a random value out of a preselected interval of random values, and use that random value as a random delay time value which must expire before the LES or BUS issues a subsequent Add Party message. In this way, the LES or BUS on an ELAN incorporating the present invention randomly temporally distributes the addition of LECs to the ELAN.

If the next Add Party message is rejected, either expressly or by lack of response within a time-out interval, the LES or BUS may issue another Add Party message. In an alternative embodiment of the present invention, the LES or BUS repeats the process of selecting a random time value from a preselected interval of random time values and issues the subsequent Add Party message after that random time value has expired. If a congested state persists, the issuing device, an LES or BUS, repeats the process until a preselected number of retries has occurred. If such a condition is reached, then the LES or BUS stops issuing Add Party messages, and the LEC seeking to join the ELAN will be unable to do so until the network congestion subsides.

In another alternative embodiment of the present invention, the number of retries is determined by a control-time-out value in a Control-Time-Out timer which may be the LANE service Control-Time-Out timer. The issuing LES or BUS repeats the process of selecting a random delay and issuing a subsequent Add Party message as long as a congested network state is indicated. However, if the congested state persists for a period of time that exceeds a preselected time-out value of the Control-Time-Out timer, the LES or BUS stops issuing Add Party messages and the LEC is removed from the ELAN.

In yet another alternative embodiment of the present invention, the interval of random time delays from which random time delay values are selected may be changed between retries. As hereinabove described, each subsequent Add Party message is issued by an LES or BUS after the expiration of a random time delay. The random time delay value is selected from a range of random time delay values. Between retries, the LES or BUS may alter a range of random time value delays from which a random time delay value is selected, from a current preselected range of random time delay values to a next preselected range of time delay values.

The foregoing has outlined rather broadly the features and technical advantages of the present invention in order that the detailed description of the invention that follows may be better understood. Additional features and advantages of the invention will be described hereinafter which from the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 schematically depicts the International Standards Organization (ISO) reference model of open system interconnection in accordance with the prior art;

DETAILED DESCRIPTION

Figure 2:
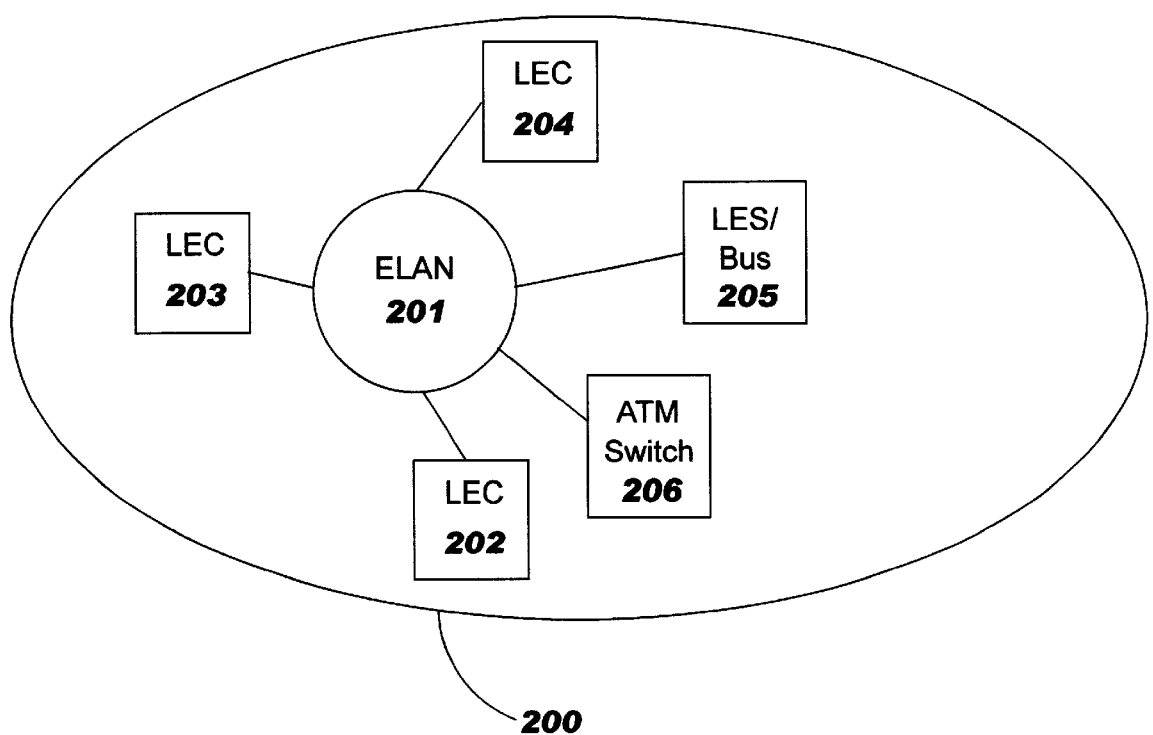
FIG. 2 schematically illustrates an embodiment of a data processing network using a method of the present invention.

In the following description, numerous specific details are set forth to provide a thorough understanding of the present invention. However, it will be obvious to those skilled in the art that the present invention may be practiced without such specific details. Refer now to the drawings wherein depicted elements are not necessarily shown to scale and wherein like or similar elements are designated by the same reference numeral through the several views.

An invention that alleviates the congestion in an ELAN when a plurality of LECs attempt to join the network will now be described in detail. Refer now to FIG. 2 in which is schematically depicted an ATM network 200, including an ELAN, ELAN 201, incorporating an embodiment of the present invention. When a LEC, such as LEC 202, seeks to communicate with a second LEC, for example LEC 203, it must first establish communication channels with the LES and BUS, LES/BUS 205. LES/BUS 205 must then initiate the addition of LEC 202 to point-to-multipoint connections that carry control and data frames from the LES and BUS 205 respectively to all of the LECs 202–204 on ELAN 201. LES/BUS 205 accomplishes this by sending Add Party messages to ATM switches, such as ATM Switch 206, within ATM network 200.

In ATM network 200, the LES and BUS have been schematically depicted as embodied in a single structure, LES/BUS 205. In other words, in ELAN 201, LES functionality and BUS functionality are depicted as residing in a single structural unit, LES/BUS 205. However, LES functionality and BUS functionality may be provided in separate structural entities.

If large numbers of LECs attempt to join an ELAN simultaneously, for example LEC 202, LEC 203, and LEC 204 on ELAN 201 in ATM network 200, then network congestion may result. Such a congested state may occur when LANE service (the protocols providing LAN emulation and hardware on which they are implemented) or the ATM network 200 recovers from a fault or is restarted.

Network congestion is detected by LES/BUS 205 when one of a set of events occurs. Either an Add Party message is not responded to within a pre-selected time-out period, or an Add Party message is rejected expressly. Express rejection is denoted by the receipt by LES/BUS 205 of one of four cause codes informing LES/BUS 205 of: a user busy condition, no user responding condition, temporary failure, or too many pending Add Party requests.

In an embodiment of the present invention, LES/BUS 205 will delay issuing subsequent Add Party messages by a random time delay value. A random time delay value is randomly selected from a preselected interval of delay time values. LES/BUS 205 then waits a period of time corresponding to this random time delay value before it issues a subsequent Add Party message. In this way, LES/BUS 205 randomly distributes the addition of LECs to ELAN 201 wherein this distribution in time is spread over a time interval corresponding to the aforementioned delay time interval.

In an alternative embodiment of the present invention, LES/BUS 205 may repeat the process of issuing Add Party messages until the congested state of the network subsides. In such an embodiment, LES/BUS 205 selects a new random time delay value from the preselected interval of time delay values prior to each subsequent issuance of an Add Party message. LES/BUS 205 repeats this process until either the network congestion subsides, or a preselected condition is reached, terminating the issuance of Add Party messages. In one such alternative embodiment, the preselected condition may occur when a preselected number of retries has been attempted without the network congestion abating. In another such embodiment, the preselected condition may occur when a number of retries has been attempted over a preselected interval of time during which the network congestion fails to subside.

In yet another embodiment of the present invention, LES/BUS 205 may modify the preselected interval of time delay values between retries. In such an embodiment, a first preselected interval of time delay values may be replaced by a next preselected interval of time delay values after a first preselected number of retries has occurred. Moreover, in yet another embodiment, these first and next preselected time delay intervals may be members of a preselected ordered set of time delay intervals wherein LES/BUS 205 selects a random time delay value from each succeeding member of the ordered set of random time delay intervals after each occurrence of the preselected number of retries has occurred. In one such embodiment of the present invention, the preselected ordered set of time delay intervals may be a preselected nested set of random time delay intervals. In this way, LES/BUS 205 increases the temporal distribution of joining LECs as the duration of network congestion increases.

Figure 3:
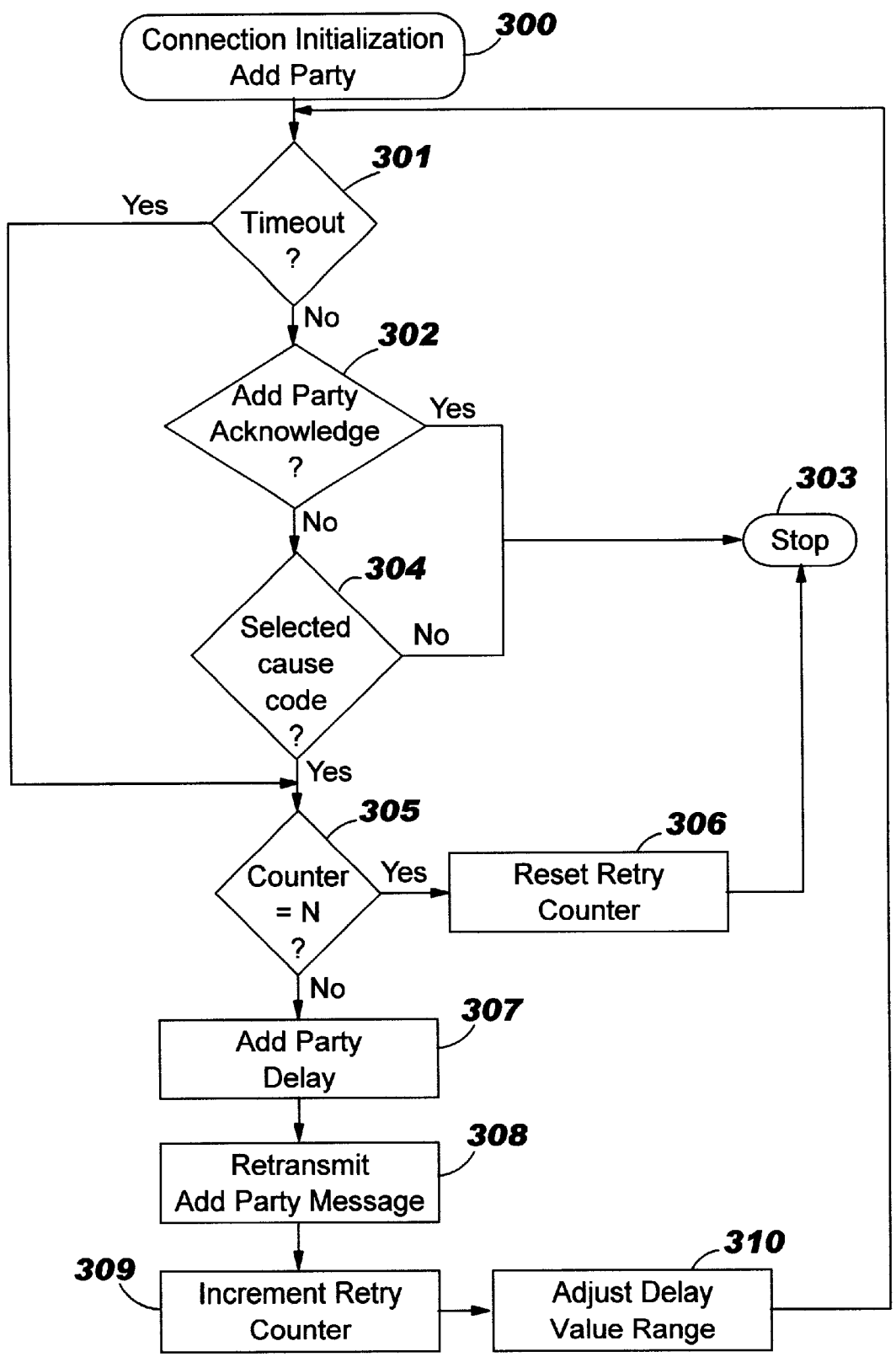
FIG. 3 depicts a flow diagram in accordance with a method of an embodiment of the present invention.

In order that the present invention may be more fully appreciated, refer now to FIG. 3 in which a flowchart of an embodiment of the present invention is depicted. The process of the present invention begins when the LES or BUS, such as LES/BUS 205, attempts to add an LEC, such as LEC 202, to an ELAN, such as ELAN 201, by issuing an Add Party message, step 300. The LES or BUS 205 issuing the Add Party message expects a response from an ATM switch 206 receiving the message. The LES or BUS 205 will either receive no response at all within a preselected period of time, or will receive a reply before the preselected period of time expires, step 301. If the Add Party message was successfully received and forwarded, the LES or BUS 205 will receive an Add Party acknowledgment, signifying that network congestion is not present, step 302. The LEC 202 seeking to join the ELAN 201 will then be connected to the necessary point-to-multipoint connections carrying control signals to the joining LEC 202 from the LES or BUS 205, and the connection initialization process terminates, step 303.

Otherwise, a congested state may exist on the network signalled by either no response before the preselected period of time expires, step 301, or receipt of a response including one of the selected cause codes described hereinabove, step 304.

It is next determined whether a preselected number of retries, "N," has been exceeded, step 305. If a value of N is chosen that is too small, retry attempts will be terminated before network congestion is likely to abate. If N is too large, the requesting LEC 202 will be delayed in joining the network. Thus, selection of a value of N is a tradeoff. A reasonable value for N may be 15.

If the preselected number of retries has been exceeded, the requesting LEC 202 is unable to join the network 201. The retry counter is reset, step 306, and the connection initialization procedure terminates, step 303. Connections already established toward the joining LEC 202 are torn down and the LEC 202 is unable to join the network 201 so long as the network congestion persists. Such a LEC 202 that has been unable to join an ELAN 201 because of network congestion must reassert its attempt once an LES or BUS 205 has terminated its retry sequence because a persistent state of network congestion exists.

If the preselected number of retries has not been exceeded, the LES or BUS 205 enters the Add Party delay state, step 307. In the Add Party delay state, the LES or BUS 205 selects a random time delay value from a preselected delay time interval and waits until a period of time equal to the selected random time delay value elapses. It then retransmits its Add Party message, step 308. The LES or BUS 205 also increments the retry counter, step 309, and adjusts the time delay interval, step 310, as hereinabove described. The process then repeats until either the congested state abates, or the number of retries exceeds the preselected permissible number of retries, "N."

Figure 4:
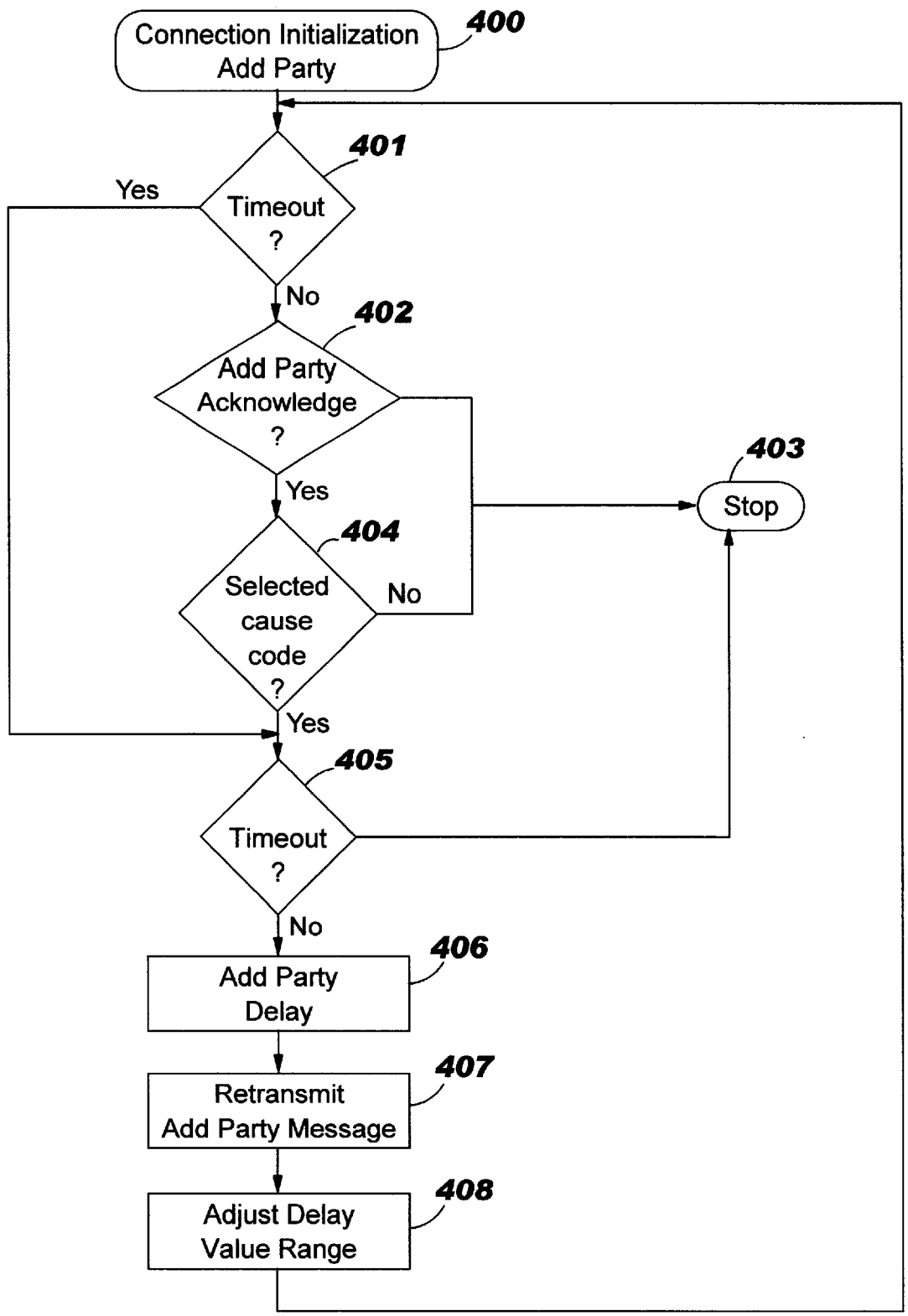
FIG. 4 illustrates a flow diagram in accordance with a method of an alternative embodiment of the present invention.

In an alternative embodiment of the present invention, the number of retries during a congested state of the network may be time limited. Refer now to FIG. 4 depicting a flow diagram of a method in accordance with such an embodiment. As previously described, an LES or BUS 205 responds to a connection initialization attempt by an LEC 202 by issuing an Add Party message, step 400. If the network is uncongested and the connection from the LES or BUS 205 to the LEC 202 can be established, the LES or BUS 205 no acknowledgment time out will occur, step 401, will receive an Add Party acknowledgment, step 402, and the connection initialization process terminates, step 403, as previously described. If, however, no response is received within a pre-selected time-out period, step 401, or a selected cause code, as described hereinabove, is received, step 404, a congested state exists on the network 201.

The LES or BUS 205 then determines whether the network congestion has persisted for a time interval exceeding a preselected time-out interval, step 405. If the congestion has persisted for a duration exceeding this time-out period, the joining LEC 202 is not added to the ELAN 201, any connections to the LEC 202 are torn down, and the connection initialization process terminates, step 403. As previously described, the LEC 202 then must reassert its attempt to join the ELAN 201.

If the duration of the network congestion has not exceeded this preselected time-out interval, the LES or BUS 205 retries to establish a connection to the LEC 202. It enters the Add Party delay state, step 406. As previously described, in the Add Party delay state, the LES or BUS 205 selects a random time delay value from a preselected delay time interval, and waits until a time period elapses equal to the random time delay value. It then retransmits an Add Party message, step 407. The LES or BUS 205 may adjust the delay time interval from which the random time delay values are selected, step 408. The process then repeats until the network congestion abates and a successful connection is established, or the network congestion persists for an interval of time in excess of the preselected time-out interval. This time-out interval may be determined by the Control Time-Out timer within an LES, as defined in LANE protocols, but other embodiments may employ other timers.

Figure 5:
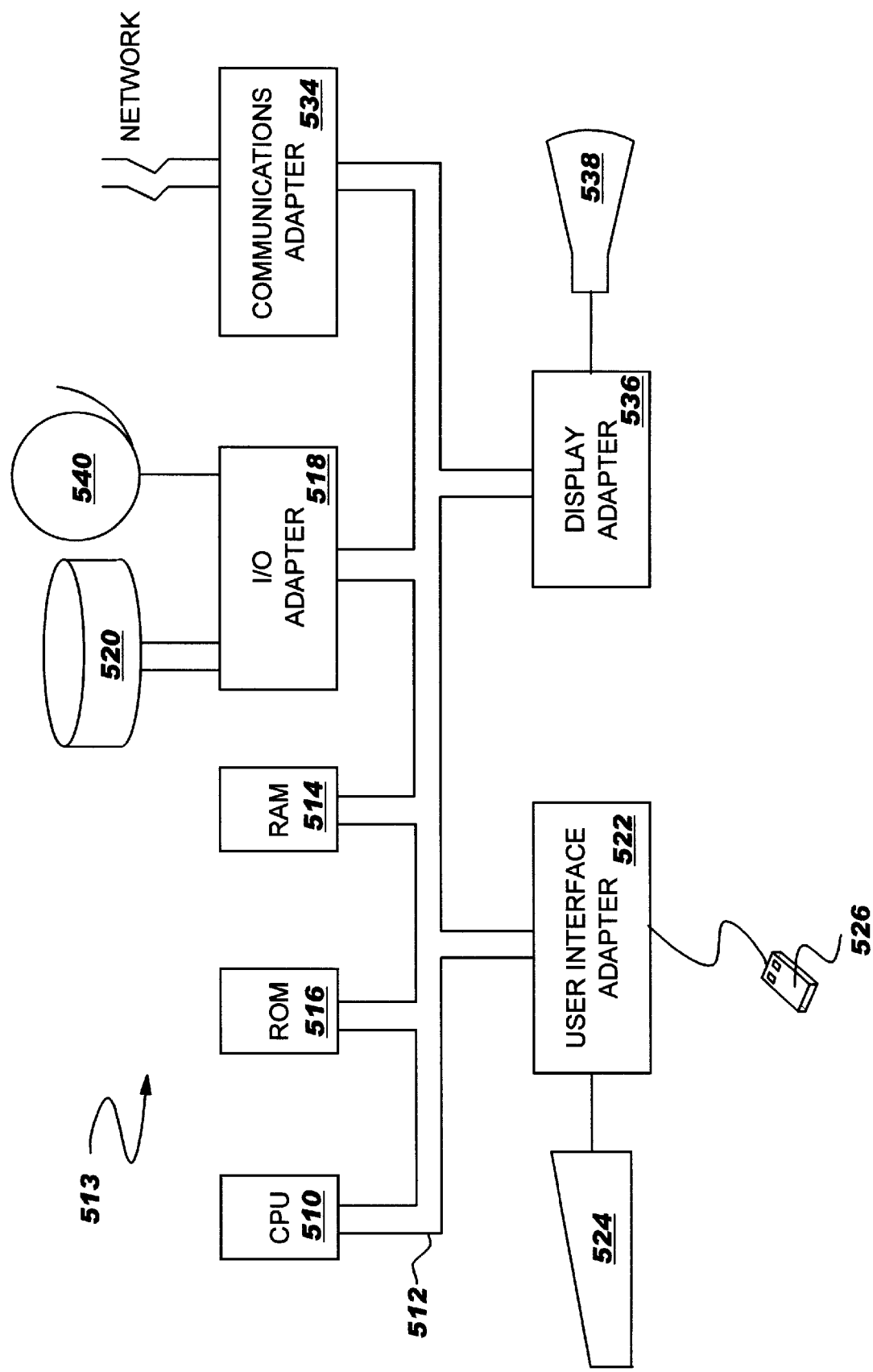
FIG. 5 illustrates a data processing system configured in accordance with an embodiment of the present invention.

In an embodiment of the present invention, a LES or BUS such as LES/BUS 205 may be realized in a workstation. A representative hardware environment for practicing the present invention in such an embodiment is depicted in FIG. 5, which illustrates a typical hardware configuration of workstation 513 in accordance with the subject invention having central processing unit (CPU) 510, such as a conventional microprocessor, and a number of other units interconnected via system bus 512. Workstation 513 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, and/or other user interface devices such as a touch screen device (not shown) to bus 512, communication adapter 534 for connecting workstation 513 to a data processing network, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. CPU 510 may also reside on a single integrated circuit. In one embodiment, a instruction set implementing the method of the present invention may be stored in ROM 516. In an alternative embodiment this instruction set may be located in a mass storage device, such as disk units 520. In such embodiments, when a LEC seeks to join the network on which workstation 513 resides, workstation 513, serving as an LES or BUS, will load the instruction set implementing the LAN emulation service delay of the present invention into RAM 514 from ROM 516 or disk units 520, as appropriate. CPU 510 would then execute this instruction set in order to perform the steps of the LAN emulation service delay, for example, the method of FIG. 3, or in another embodiment, the method of FIG. 4.

Figure 6:
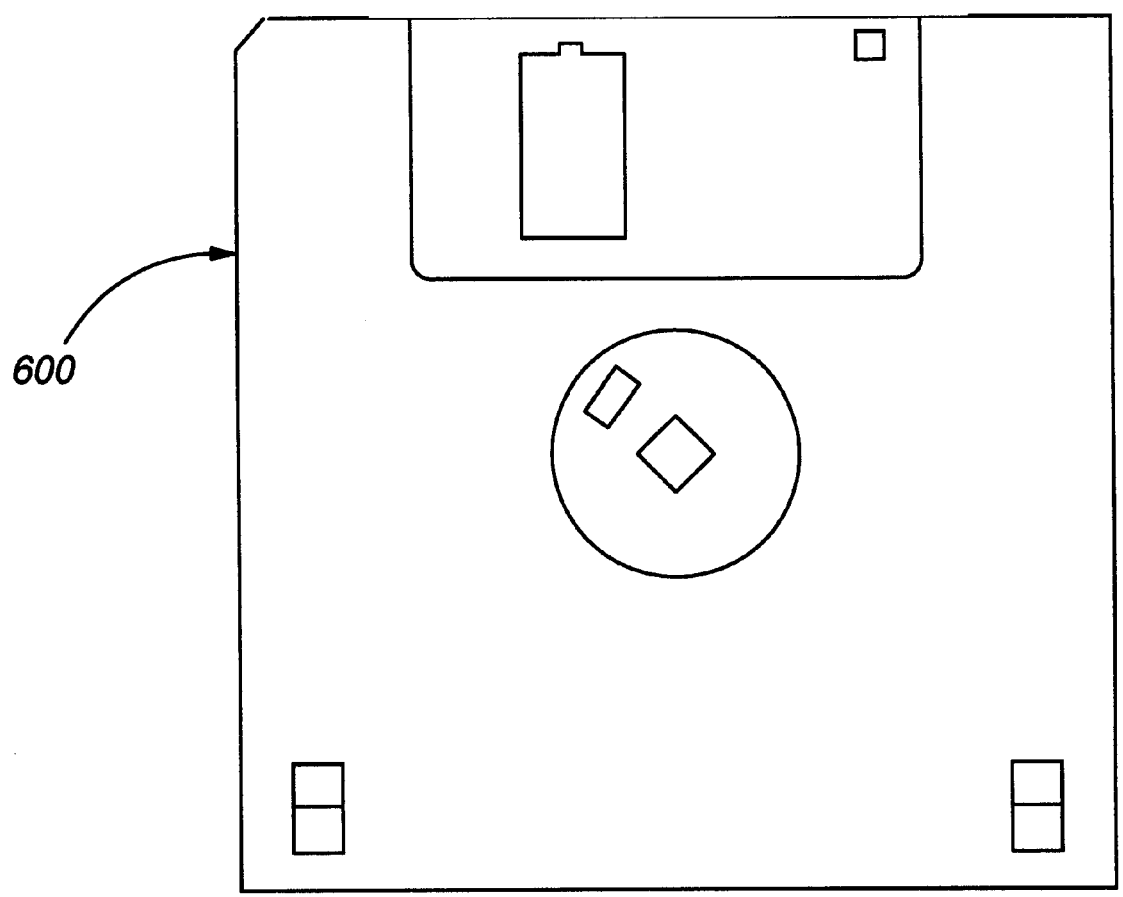
FIG. 6 is a plan view of a computer disc on which the computer program to perform the method can reside.

FIG. 6 shows a disc 600 on which the computer program that performs the method, according to the teachings of the present invention, can reside. The program can be embedded on any type of computer storage medium without deviating from the teachings of the present invention.

Although the present invention and its advantages have been described in detail, it should be understood that various changes, substitutions and alterations can be made herein without departing from the spirit and scope of the invention as defined by the appended claims. Accordingly, it is intended, by the appended claims, to cover all modifications of the invention which fall within the true spirit and scope of the invention.

What is claimed is:

1. A method comprising the steps of:

issuing from a first device to a second device a first control signal that causes said second device to provide connectivity among a group of predetermined devices; and said first device entering a delay state by not issuing the first control signal until an occurrence of an event in a predetermined set of events wherein said predetermined set of events includes rejection of said first control signal by the second device according to a predetermined set of cause codes or expiration of a preselected timeout value.

2. A method comprising the steps of:

issuing from a first device to a second device a first control signal that causes said second device to provide connectivity among a group of predetermined devices;

said first device not issuing the first control signal until an occurrence of an event in a predetermined set of events;

said first device selecting a random delay time value from a predetermined interval of delay time values; and issuing from said first device a next control signal after said random delay time value has elapsed.

3. The method of claim 2 further comprising the steps of:

said first device entering a sequence of delay states in response to an occurrence of an event in a predetermined set of events; and terminating said sequence of delay states after a preselected termination condition is reached, and wherein an instance of entering a delay state of said sequence of delay states forms a retry, and a plurality of such instances of entering a delay state of said sequence of delay states forms a plurality of retries.

4. The method of claim 3 wherein said retry comprises the steps of:
   said first device selecting a random delay time value from a predetermined interval of delay time values; and
   issuing from said first device a next control signal after said random delay time value has elapsed.

5. The method of claim 4 wherein said predetermined set of events includes:
   rejection of said next control signal according to a predetermined set of cause codes; and
   expiration of a preselected timeout value.

6. The method of claim 5 wherein said first control signal is an add party message, and said next control signal is an add party message.

7. The method of claim 6 wherein said preselected termination condition comprises a timeout of a timer after a preselected interval of time has elapsed.

8. The method of claim 6 wherein said preselected termination condition comprises a number of said plurality of retries exceeding a preselected maximum number of retries.

9. The method of claim 4 wherein said retry further comprises the step of:
   said first device changing said predetermined interval of delay time values to a next predetermined interval of delay time values.

10. The method of claim 9 wherein said first control signal is an add party message, and said next control signal is an add party message.

11. The method of claim 10 wherein said preselected termination condition comprises a timeout of a timer after a preselected interval of time has elapsed.

12. The method of claim 10 wherein said preselected termination condition comprises a number of said plurality of retries exceeding a preselected maximum number of retries.

13. In a data processing network, a method of reducing congestion comprising the steps of:
   issuing from a first device to a second device a first add party message that causes the second device to provide connectivity to predetermined devices;
   said first device entering a first delay state of not issuing the first add party message, in response to an occurrence of an event in a predetermined set of events,
   wherein said predetermined set of events includes:
      Said first device receiving a rejection, generated by the second device, of said first add party message according to a predetermined set of cause codes; and expiration of a preselected timeout value or wherein said step of entering a first delay state comprises the steps of:
      said first device selecting a random delay time value from a predetermined interval of delay time values; and
      said first device issuing a next control signal after said random delay time value has elapsed;
   entering a sequence of delay states in response to an occurrence of an event in said predetermined set of events; and
   said first device terminating said sequence of delay states after a preselected termination condition is reached,
   wherein an instance of entering a delay state of said sequence of delay states forms a retry, and a plurality of such instances of entering a delay state of said sequence of delay states forms a plurality of retries, after said first delay state.

14. The method of claim 13 wherein said retry comprises the steps of:
   said first device selecting a random delay time value from a predetermined interval of delay time values; and
   said first device issuing a next control signal after said random delay time value has elapsed.

15. The method of claim 14 wherein said retry further comprises the step of:
   said first device changing said predetermined interval of delay time values to a next predetermined interval of delay time values.

16. A data processing system comprising:
   an emulated Local Area Network (ELAN);
   a first data processing device attached to said ELAN;
   a second data processing device attached to said ELAN, said second data processing device including circuitry for sending control signals to said first data processing device, wherein said circuitry is operable for entering a delay state of not sending control signals, in response to an occurrence of an event in a predetermined set of events wherein said predetermined set of events includes rejection of said first control signal by the second device according to a predetermined set of cause codes or expiration of a preselected timeout value.

17. The data processing system of claim 16 wherein said second data processing device further comprises circuitry operable for entering a sequence of delay states in response to an occurrence of an event in a predetermined set of events, and said second data processing device terminating said sequence of delay states after a preselected termination condition is reached, and
   wherein an instance of said second data processing device entering a delay state of said sequence of delay states forms a retry, and a plurality of such instances of entering a delay state of said sequence of delay states forms a plurality of retries.

18. The data processing system of claim 17 wherein said step of entering a delay state further comprises:
   said second data processing device selecting a random delay time value from a predetermined interval of delay time values; and
   said second data processing device issuing a next control signal after said random delay time value has elapsed.

19. The data processing system of claim 18 wherein said retry comprises the steps of:
   said second data processing device selecting a random delay time value from a predetermined interval of delay time values; and
   said data processing device issuing a next control signal after said random delay time value has elapsed.

20. The data processing system of claim 19 wherein said second data processing device is a LAN Emulation Server (LES).

21. The data processing system of claim 19 wherein said second data processing device is a Broadcast and Unknown Server (BUS).

22. A data processing system comprising:
   an emulated Local Area Network (ELAN);
   a first data processing device attached to said ELAN;
   a second data processing device attached to said ELAN, said second data processing device including circuitry for sending control signals to said first data processing device, wherein said circuitry is operable for entering a delay state of not sending control signals, in response to an occurrence of an event in a predetermined set of events coming from sources including the first data processing device wherein said predetermined set of events includes rejection of the control signals by said first data processing device according to a predetermined set of cause codes; or expiration of a preselected timeout value at said second data processing device.

23. The data processing system of claim 22 wherein said operability for entering a delay state further comprises:

said second data processing device selecting a random delay time value from a predetermined interval of delay time values; and said second data processing device issuing a next control signal after said random delay time value has elapsed.

24. The data processing system of claim 23 wherein said control signals comprise an add party message.

25. A program product adaptable for storage on a program storage media, the program product operable for reducing congestion in a data processing network, said program product comprising:

programming code for causing a first device to issue a first control signal;

programming code for causing said first device to enter a delay state;

programming code that causes said first device to respond to an occurrence of an event in a predetermined set of events wherein said predetermined set of events includes rejection of said first control signal according to a predetermined set of cause codes; or expiration of a preselected timeout value.

26. The program product adaptable for storage on a program storage media of claim 25 wherein said programming for entering a delay state further comprises:

programming code that causes said first device to select a random delay time value from a predetermined interval of delay time values; and programming code that causes said first device to issue a next control signal after said random delay time value has elapsed.

27. The program product adaptable for storage on a program storage media of claim 26 wherein said programming for entering a delay state further comprises:

programming for entering a sequence of delay states in response to an occurrence of an event in a predetermined set of events; and programming for terminating said sequence of delay states after a preselected termination condition is reached, and wherein programming for an instance of entering a delay state of said sequence of delay states forms programming for a retry, and programming for a plurality of such instances of entering a delay state of said sequence of delay states forms programming for a plurality of retries.

28. The program product adaptable for storage on a program storage media of claim 27 wherein said programming for a retry further comprises:

programming for selecting a random delay time value from a predetermined interval of delay time values; and programming for issuing a next control signal after said random delay time value has elapsed.

29. The program product adaptable for storage on a program storage media of claim 28 wherein said predetermined set of events includes:

rejection of said next control signal according to a predetermined set of cause codes; and expiration of a preselected timeout value.

30. The program product adaptable for storage on a program storage media of claim 29 wherein said first control signal is an add party message, and said next control signal is an add party message.

* * * * *